United States Patent
Quattrociocchi

[11] Patent Number: 5,678,379
[45] Date of Patent: Oct. 21, 1997

[54] BOTTOM PLATE ANCHOR FOR BUILDING FRAMES

[76] Inventor: Luciano Quattrociocchi, 240 Dew Street, King City Ontario, Canada, L0G 1K0

[21] Appl. No.: 606,530

[22] Filed: Feb. 23, 1996

[30] Foreign Application Priority Data

Mar. 15, 1995 [CA] Canada ................. 2144720

[51] Int. Cl.$^6$ ................................. F04B 1/38
[52] U.S. Cl. ................ 52/712; 52/713; 52/715; 403/231; 403/232.1; 403/403
[58] Field of Search ............... 52/712, 713, 714, 52/715, 489.1, 489.2, 702; 403/232.1, 403, 231

[56] References Cited

U.S. PATENT DOCUMENTS

| | | | |
|---|---|---|---|
| 3,210,898 | 10/1965 | Kurtz | 52/715 X |
| 3,730,466 | 5/1973 | Swanquist | 52/714 X |
| 4,366,660 | 1/1983 | Pearson | 52/712 X |
| 4,410,294 | 10/1983 | Gilb et al. | 403/232.1 X |
| 4,414,785 | 11/1983 | Howell | 52/713 X |
| 4,572,695 | 2/1986 | Gilb | 403/232.1 |
| 4,897,979 | 2/1990 | Colonias | 52/702 X |
| 4,910,934 | 3/1990 | Hennings | 52/714 X |
| 5,408,796 | 4/1995 | Hashimoto et al. | 52/489.2 |
| 5,519,976 | 5/1996 | Gee | 52/715 X |
| 5,531,052 | 7/1996 | Agar | 52/489.2 |
| 5,598,680 | 2/1997 | Wilhelmi | 52/712 X |

FOREIGN PATENT DOCUMENTS

4208321  8/1992  Germany ............... 52/489.1

Primary Examiner—Carl D. Friedman
Assistant Examiner—Winnie Yip
Attorney, Agent, or Firm—K. Maxwell Hill

[57] ABSTRACT

A bendable metal stamping has upstanding arms adapted to overlie the narrow dimension of a wooden stringer in use as a bottom plate of a building frame. The stamping has legs extendable toward the perimeter of the building and are attached to the floor. The stamping is bendable along a line parallel to the bottom edge of the inner one of the arms and the inner edge of the legs.

2 Claims, 3 Drawing Sheets

BOTTOM PLATE ANCHOR FOR BUILDING FRAMES

FIELD OF INVENTION

The present invention relates to a means and method of anchoring the bottom plate of a frame wall to the sub floor of a building while the frame studs and top plate are being formed and prior to the raising of the wall frame from the horizontal framing mode to the vertical "in place" mode. In particular the invention disclosed herein is a bendable metal stamping having a pair of upstanding arms adapted to overlie the narrow dimension of a bottom plate and a leg or legs extendable toward the perimiter of the floor to which a wall is to be erected. The stamping is bendable along a line parallel to the bottom edge of the inner one of the arms and the inner edge of the legs.

PRIOR ART

It is the common practice in the construction of frame walls that are put together in a horizontal mode prior to erection to vertical as a wall, to set the bottom plate on its narrow side along a chalk line marked across the sub floor at a distance equal to the wide side of the bottom plate and parallel to the perimeter edge of the sub floor. The narrow side facing the floor is then "toed in" to the sub floor by nailing which nails fix the frame to the floor while being constructed and act as a hinge to the wall holding it along the chalk mark while being erected to the vertical with the bottom plate neatly falling flush and parallel to the outer edge of the sub floor.

DISADVANTAGES OF THE PRIOR ART

When the bottom plate is toed in by nailing it the sub floor along the chalk line prior to the construction of the frame to it there is found that considerable bother is encountered in removing the nails after the frame has been erected and the plate set in place. The nails protruding from the hinged plate cause discontinuites along the bottom edge of the erected wall which results in the bottom of a wall and base boards to be uneven. The nails must be removed prior to the plasterers and wall finishers performing their functions. When house wrap is empoyed to cover the bottom plate of the wall and to wrapover the joists and sill in the construction of high insulation houses the wrap will obscure the chalk line causing difficulty in placement of the bottom plate the required distance from the outer basement edge. The present invention overcomes the above described disadvantages of the prior common method of setting a bottom plate.

SUMMARY OF THE INVENTION AND OBJECTS THEREOF

The object of the present invention is to provide an anchor means for fixing to the sub floor of a building in the process of erection and into which a bottom plate can be attached while a frame is built onto the bottom plate prior to its erection as a wall of the building. The anchor comprises a metal stamping of planar shape marked along certain lines of weakness and having a mid-portion bounded by a pair of spaced in-parallel side lines of weakness. The anchor means has a first bendable portion upon one edge capable of being angulated about a first line of weakness between co-planarity with respect to said stamping and right angularly with respect thereto. A second bendable portion capable also of being rotated between co-planarity with said stamping into parallel with said first mentioned portion along another line of weakness parallel with said first line of weakness so that the two said portions can lie parallel and spaced at right angles to said stamping. The anchor stamping has third and fourth portions spaced apart on either side of said second portion bendable about third and fourth lines of weakness in the planar body of the stamping and in parallel and right angularity with the stamping into at least parallel co-planarity with said second portion. Sharp distal edges are made to the first and second portions to allow a sheet of house wrap to be pusheddown into the formed and bent stamping to overlie the interior thereof prior to the insertion of the bottom plate into the formed stamping anchor member.

IN THE DRAWINGS

With the foregoing objects in view and such advantages or novel features as may become apparent from consideration of this disclosure and specification the present invention consists of the concept which is comprised, embodied and embraced and included in the use construction and arrangement of parts or any new use of the same herein exemplified in the specific embodiment of the concept; reference being had to the accompanying drawings wherein like reference numerals refer to like parts.

THE PREFERRED EMBODIMENT OF THE INVENTION AND OPERATION THEREOF

Figure 1:
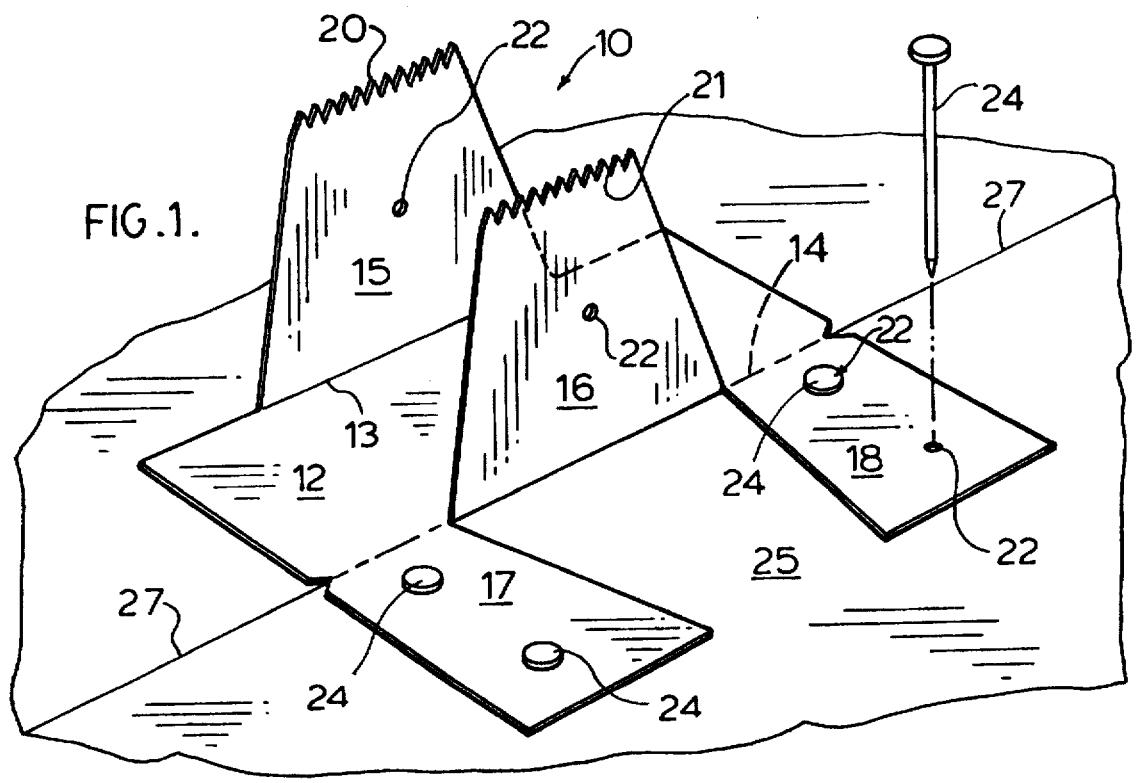
FIG. 1 is a perspective view of the plate anchor shown secured to a sub floor along a chalk line thereon.

In the drawings numeral 10 designates the anchor means of the invention and is made from a metal bendable stamping with a web portion 12 upright portions 15,16 and legs 17,18. Numeral 14 designates in dotted form a line of weakness made in the stamping during fabrication and is the hinge line along which the anchor will move during erection of the frame wall 13 is a line of weakness created in the stamping during fabrication to allow the upright portion to be bent to result in the U-shape of the device. 27 is a chalk line on the sub floor 25. Holes 22 are made thru each upright to receive a nail means to secure the anchor and bottom plate together. Holes 22 are also made in each of the legs 17,18 to receive nail means 24 to fasten the anchor 10 to sub floor 25. A serrated or pointed end 20,21, is provided to the distal ends of upright portions 15,16 when a sheet of house wrap (not shown) is forced down over the anchor and over the floor to extend over the floor to the edge of the building and down over the joist end 31 to wrap all of the outer material above the basement block as required by high efficientcy insulation codes.

Figure 2:
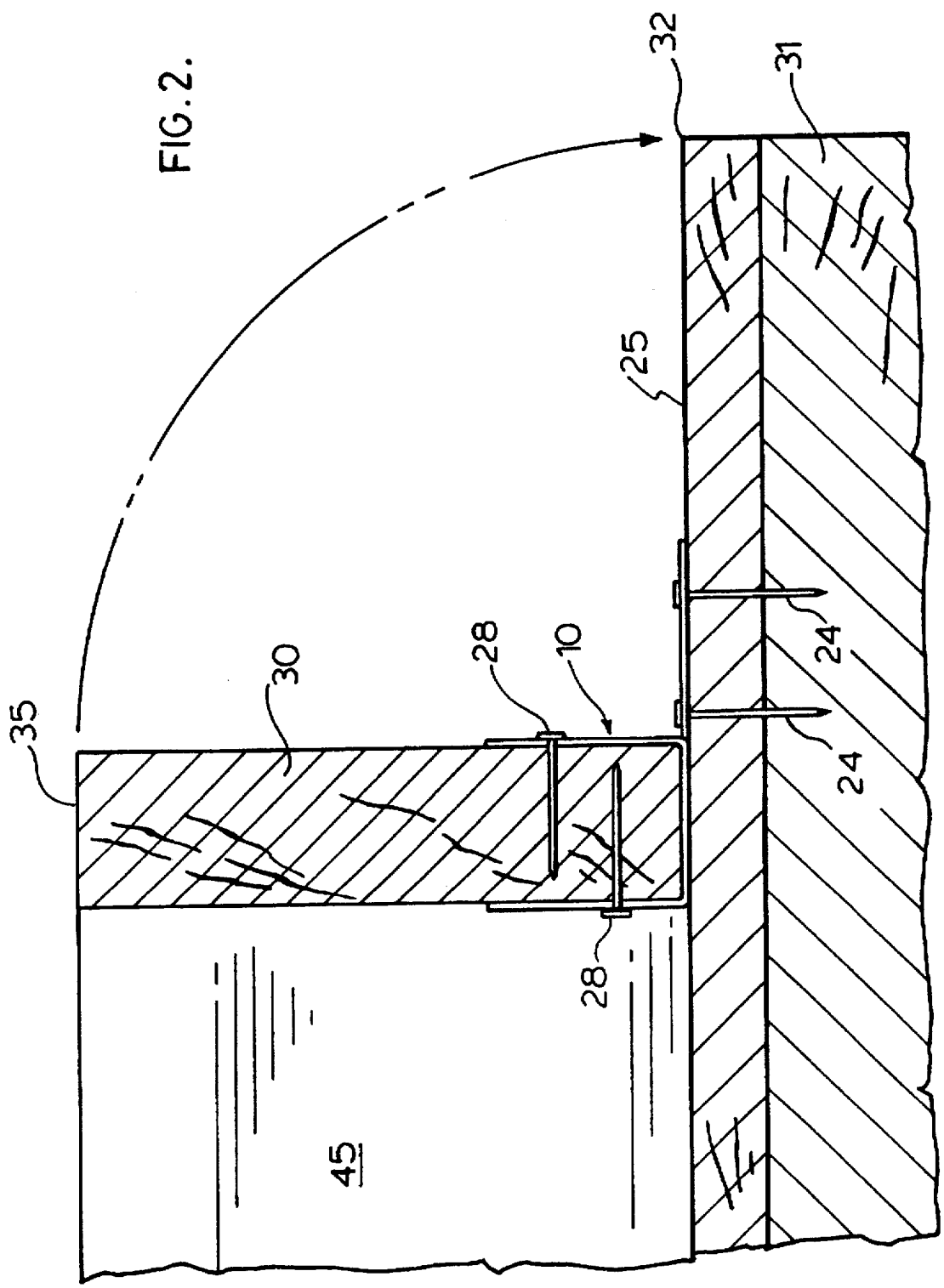
FIG. 2 is a section view through a building floor with the bottom plate set with its narrow edge into the anchor and the anchor and plate fixed to the floor the distance from the wall edge required.
Figure 3:
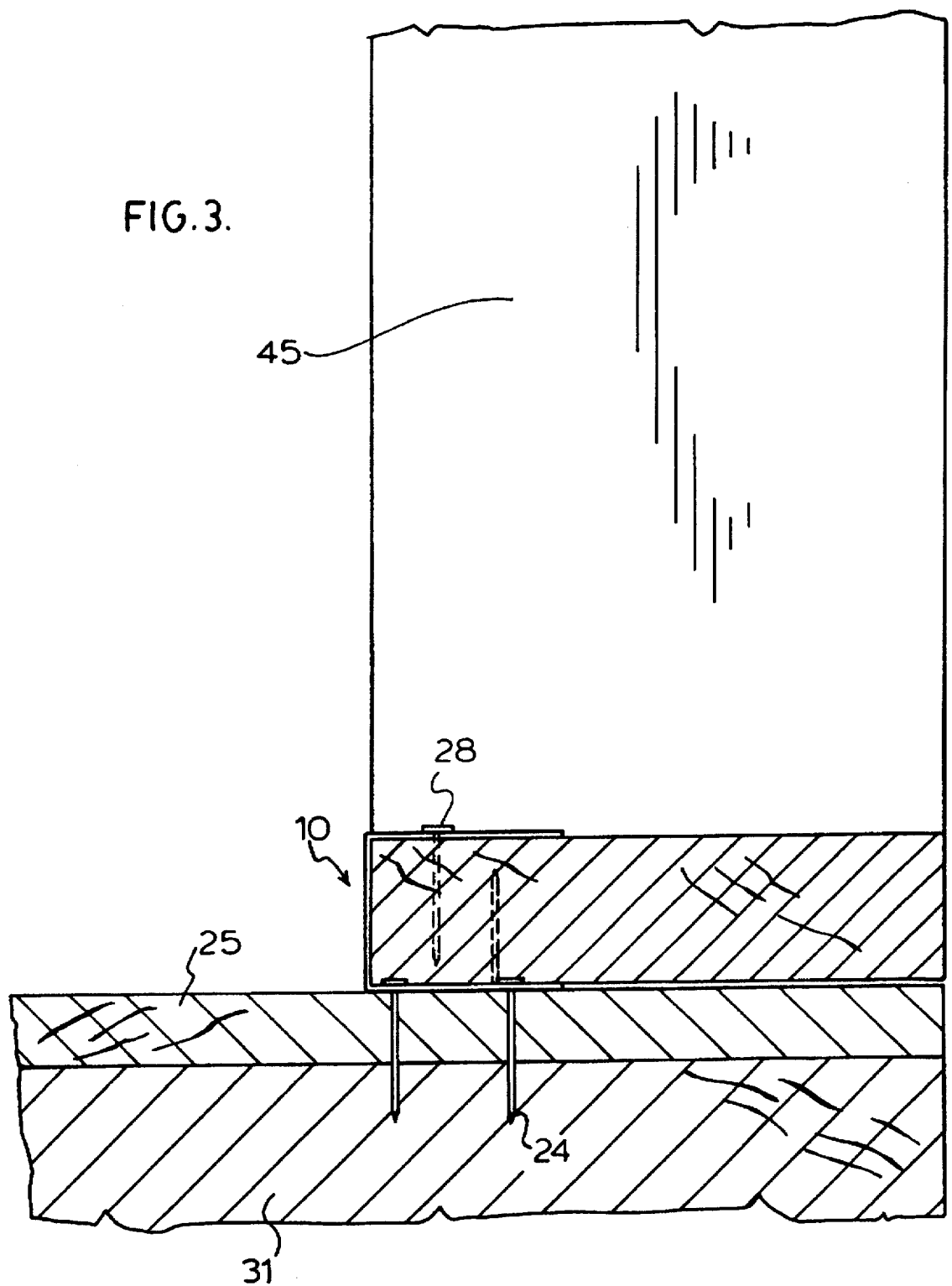
FIG. 3 is a sectional view through the floor and bottom plate taken after the frame as attached to the plate and anchor has been shifted upwards to vertical with the anchor acting as the fixed hinge and the outer face of the wall coming flush and parallel with the joist end and floor edge.

In FIG. 2 a bottom plate 30 is shown with its narrow dimension set down into the anchor 10 and secured thereto by nails 28 and the anchor is shown secured by nails 24 through floor 25 into the joist 31. Numeral 45 designates the side of the frame wall that is being attached to the bottom plate 30 of the wall. Numeral 35 designates the edge of the wall frame and the dot-dash line curving with the arrow at the end pointing to floor perimeter corner 32 is the path of travel of the wall as the anchor bends along its line of weakness and held in place to the floor 25 by nail means 24. FIG. 3 shows the combination of wall plate and anchor bracket set in final upright position parallel on its outer side flush with the floor edge and joist end.

What I claim is:

1. In the erection of wall frames in building carpentry;

a bottom plate anchor comprising an initially planar stamping having a mid-portion bounded by a pair of spaced in-parallel side lines of weakness;

a first bendable portion upon one edge of said stamping capable of being angulated about said pair of lines of weakness between co-planarity with respect to said stamping and right angularity with respect thereto, a second bendable portion capable also of being rotated between co-planarity with said stamping into parallel with said first bendable portion along another line of said pair of lines of weakness parallel with said first line of weakness so that the two said portions can lie parallel and spaced at right angles to said stamping; and third and fourth portions spaced apart on either side of said second portion bendable about third and fourth lines of weakness into parallel right angularity with said stamping into at least parallel co-planarity with said second portion.

2. A bottom plate anchor as in claim 1 wherein said first and second portions are provided with toothed distal edges.

* * * * *